United States Patent [19]

Boon

[11] 4,197,269
[45] Apr. 8, 1980

[54] PROCESS FOR PRODUCTION OF LARGE DIMENSION POLYESTER-DERIVED POLYURETHANE FOAM

[75] Inventor: Derk J. Boon, Charlotte, N.C.

[73] Assignee: Reeves Brothers, Inc., New York, N.Y.

[21] Appl. No.: 939,057

[22] Filed: Sep. 1, 1978

[51] Int. Cl.² ............................................. B29D 27/04
[52] U.S. Cl. ........................................ 264/54; 264/216; 264/331; 264/DIG. 84; 521/163
[58] Field of Search ............ 264/51, 53, 54, DIG. 84, 264/40.7, 40.2, 40.3, 40.1, 331, 216; 521/163

[56] References Cited
U.S. PATENT DOCUMENTS

| | | | |
|---|---|---|---|
| 3,325,823 | 6/1967 | Boon | 264/54 X |
| 3,734,668 | 5/1973 | Porter | 264/51 X |
| 3,786,122 | 1/1974 | Berg | 264/54 X |
| 3,887,670 | 6/1975 | Porter | 264/54 X |
| 3,916,023 | 10/1975 | Porter et al. | 264/53 X |
| 4,074,960 | 2/1978 | Dockray | 264/51 X |

*Primary Examiner*—Philip Anderson
*Attorney, Agent, or Firm*—Pennie & Edmonds

[57] ABSTRACT

A process is diclosed for the production of large dimension polyester-derived polyurethane foam. A preferred embodiment of the invention is continuous production of polyurethane foam slabs having a height exceeding forty inches. Such heights are obtained through use of a slow-rise foam formulation. Slabs having a substantially rectangular or round cross section can be obtained using segmented inclined pouring boards. The slow-rise formulation is deposited on one inclined segment and moves down it and another segment more steeply inclined to effect the production of both rectangular or round slabs.

7 Claims, 2 Drawing Figures

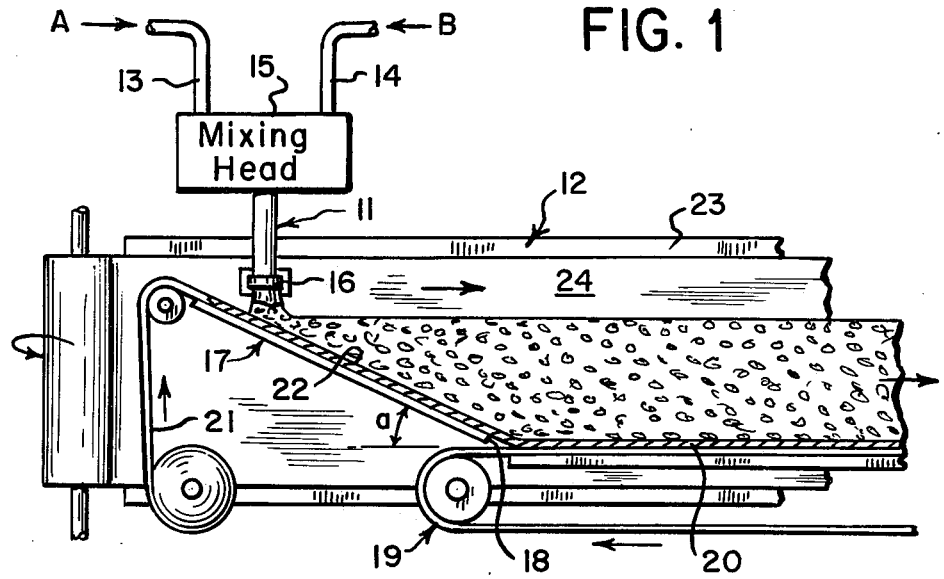
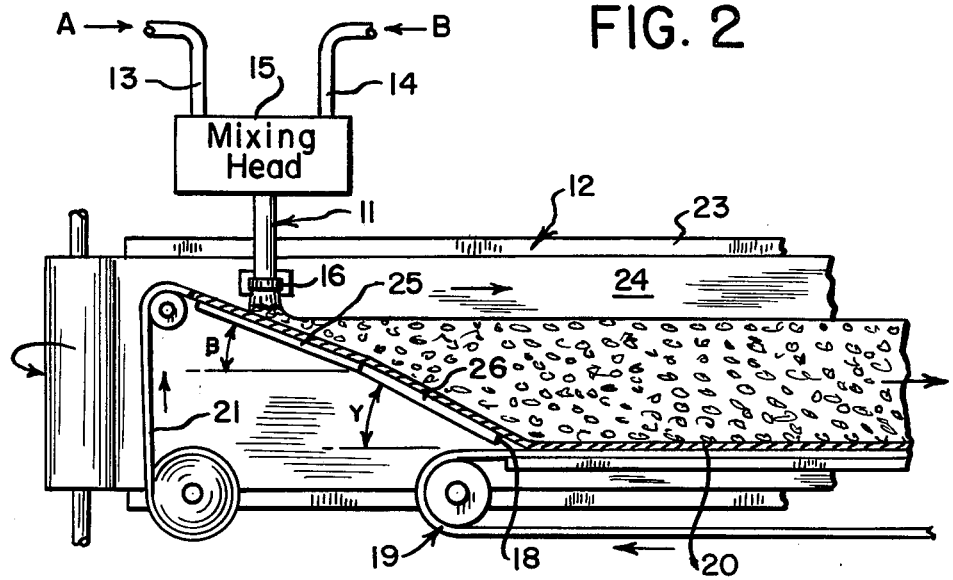

PROCESS FOR PRODUCTION OF LARGE DIMENSION POLYESTER-DERIVED POLYURETHANE FOAM

FIELD OF THE INVENTION

The present invention relates to the continuous production of cast polyurethane foams, including rigid, semirigid and flexible polyurethane foams.

BACKGROUND OF THE INVENTION

Polyurethane foams are widely used as materials from which articles such as mattresses, seat cushions, and thermal insulators are fabricated. Such polymeric foam materials are ordinarily manufactured by a casting process in which a mixture of liquid polyurethane-foam-generating reactants are deposited in a mold. As used herein, the term "mold" includes both stationary molds for batch casting and translating or otherwise moveable molds for continuous casting. Evolution of a gas causes the reactants to foam. For some foam formulations, the reactants themselves react to evolve sufficient gas; in others, a blowing agent is mixed with the reactants to provide gas evolution. Continued gas evolution causes the foam to expand to fill the mold. The foam becomes increasingly viscous as the reactants polymerize, ultimately curing into a polyurethane foam casting shaped by the mold.

Slabs of polyurethane foam approximately rectangular and round in cross section are conventionally cast in a translating channel-shaped mold. Such molds typically include a belt conveyor forming the bottom of the mold and a pair of spaced-apart, opposing side walls, which can be fixed or translatable at the speed of the conveyor. The mold sides and bottom are generally lined with one or more sheets of flexible-web such as kraft paper or polyethylene film. The sheets of mold liner are ordinarily withdrawn from rolls and continuously translated along the mold channel at the same speed as the belt of the conveyor. A liquid foam-generating reaction mixture is deposited on the mold bottom in a zig-zag pattern from a nozzle positioned above the mold which is reciprocated back and forth across the width of the mold. Typically, as the foam expands, the reaction mixture will merge into a uniform slab of foam.

If fresh reaction mixture is deposited on top of foam generated from previously deposited reactants, the resulting cured foam will have an uneven surface and nonuniform density, which is undesirable for most applications. By continuously translating the mold liner, the reaction mixture is continuously carried away from the pouring area below the pouring nozzle, which reduces the tendency for fresh reaction mixture to cover previously deposited mixture.

Propitious selection of conveyor speed can prevent production of undesirable foam products. A range of speeds can be established for a particular reaction mixture formulation. Minimum speed is achieved when liquid reaction mixture is evenly distributed on the bottom of the mold and does not flow in a direction opposite to that of the mold and conveyor. Selection of an appropriate speed requires consideration of the chemical reaction occuring subsequent to the depositing of liquid mixture in the mold. During residence in the mold, the liquid mixture foams and cures. Because economy necessitates maximum product height, lower speeds are preferred during the foaming portion of the reaction to attain such heights.

To reduce further the tendency of the liquid reactants to flow back under the pouring nozzle and to assist the "zig-zags" of reaction mixture to merge uniformly, it is customary to incline a pouring board, the surface under the nozzle, from horizontal so that the bottom liner slopes downward in the direction of translation. The maximum angle of inclination is different for different foam formulations, such as polyester polyurethane foams.

Also, problems arise if the mold bottom slopes downward along its entire length. Conventional continuous slab molds are quite long, typically in excess of 60 feet, to provide for integrity of the foam. Building a translatable mold of this length inclined from horizontal is significantly more expensive than building a translatable mold of the same length which is horizontal, because, for example, the building housing and the super structure supporting the inclined mold would require a higher investment. Moreover, it is especially expensive to provide for changing the angle of inclination of the entire mold to compensate for differing viscosities among the various foam formulations. Thus some continuous slab molds have horizontal belt conveyors for most of the length of the mold bottom, but have relatively short inclined and adjustable pouring boards located beneath the pouring nozzles. The expansion and rise of the foam generally takes place on the sloping pouring board.

A second reason for providing a pouring board which makes an angle with respect to the belt conveyor concerns the cross-sectional shape of the slab cast the the mold. As the foam expands and rises in the mold, it encounters the sides of the mold. If the mold-side liners are being translated substantially parallel to the mold bottom, the expanding foam experiences a shear force which resists its rise along the sides. This shear force results in a rounding of the top of the rectangular slab to form a crown or crest of convex shape, much like a loaf of bread. For most applications such rounded portions are unusable and must be discarded as scrap. Thus, the more nearly rectangular the cross section of the slab, i.e., the flatter the top, the more economical is the casting process. U.S. Pat. No. 3,325,823 describes one method known and used commercially for making flat top blocks of polyurethane foam.

If, over the length the foam travels as it expands, the mold bottom liner and the two mold side liners are translated, not in parallel, but at an angle with respect to one another, the mold side liner can have a velocity component relative to the mold bottom in the direction of the expansion of the foam which can compensate for the shear force which resists the rise of the foam. Guiding the mold-bottom liner across an inclined pouring board, which is located between the side walls of a slab mold and intersects the mold-bottom conveyor at an angle, can provide such a compensating velocity component when the foam expansion is carried out over the length of the pouring board and mold-side liners are translated parallel to the mold-bottom conveyor. The angle of intersection which ordinarily leads to polyurethane foam slabs having the most nearly rectangular cross sections is about 10° for typical foam formulations and production conditions. Unfortunately, if the pouring board is sloped about 10° from horizontal, freshly deposited reaction mixture tends to flow forward and under already-deposited reaction mixture, as discussed above, leading to foam slabs of nonuniform density or otherwise imperfect.

Although it is possible to construct a continuous slab mold with a pouring board inclined from horizontal by an angle of 4.5° and intersecting the belt conveyor at 10°, the belt conveyor in such a case is normally inclined upward by an angle of 5.5°. See, for example, U.S. Pat. No. 3,325,823. As noted above, however, inclined translatable molds are more expensive than comparable horizontal molds.

U.S. Pat. No. 3,786,122 discloses a process for producing polyurethane foam slabs which employs a horizontal, channel-shaped mold having at its forward end an inclined "fall plate" which makes an angle of significantly greater than 4.5° from horizontal. The problem of reaction mixture flowing down the inclined fall plate is obviated by prereacting the reaction mixture prior to introducing it onto the fall plate. The prereacting step is carried out in a trough which opens onto the upper edge of the fall plate. Liquid foam reactants are introduced onto the bottom of the trough and the foam which is generated is allowed to expand upwards in the trough and spill over onto the fall plate. The foam continues to expand as it is carried down along the fall plate by a translating bottom sheet. Because the prefoamed reaction mixture exiting the trough is more viscous than the initial liquid reaction mixture, the fall plate can be inclined at a greater angle from horizontal than a pouring board in a conventional polyurethane-foam slab mold.

An additional result of introducing prefoamed reaction mixture into the mold is that relatively high foam slabs can be produced as compared with conventional processes. The height to which foam rises can be thought of as being divided into two components, a first component is the result of the expansion of the foam below a horizontal plane passing through the point at which the reactants begin to foam and is determined by the decline and length of the pouring board, and a second component is the result of the rise of the foam above the horizontal plane.

Economies result from producing high slabs because, the thicker the foam slab, the less is the loss from discarding the skin or rind which generally coats polyurethane foam castings. With a conventional slab mold, if the rate of introduction of reaction mixture is kept constant and the rate of translation of the mold liner is reduced, the height of the foam slab tends to increase because more foam-generating reactant is deposited per unit length. However, because the rate of gas evolution remains essentially constant, the rising of the foam takes place over a linear distance, in addition to rising to a greater height, which gives the rising foam a steeper slope. If the rate of translation is slowed sufficiently, this slope becomes so steep that the expanding foam, particularly the youngest and most fluid portion, becomes unstable and tends to slip and shift, which results in cracks and other imperfections in the cured foam.

This problem of instability of rising foam is reduced in the process of U.S. Pat. No. 3,786,122 by introducing into the translating mold prefoamed reaction mixture which is sufficiently viscous as to be able to sustain a relatively steep slope of the pouring board as it completes its expansion. Thus the first component which determines the height of the foam can be increased. In addition to permitting higher foam slabs to be cast by reducing the translation speed of the mold liner, this process permits the use of slab molds shorter than those of conventional processes, because the slab moves a shorter distance during the curing time.

In practice, however, the process of U.S. Pat. No. 3,786,122 suffers from a number of drawbacks. The prefoamed reaction mixture introduced into the mold must be quite fluid, because the foaming mixture rising in the trough must, by gravity flow, spill over a weir structure and onto the fall plate of the mold. Thus prefoamed reactants which are too viscous to flow freely such as the polyester type cannot normally be used. This limits the height of slabs which can be obtained by the process.

SUMMARY OF THE INVENTION

The present invention is directed to a process for the production of large dimension polyester-derived polyurethane foam products. Those products exceed heights of forty (40) inches. Such heights substantially exceed those of the prior art for rectangular blocks and are accomplished through the use of a slow-rise polyester-derived polyurethane foam formulation. Specifically, the formulation utilizes particular quantities of amine catalyst and surfactant so that the rise time of the modified formulation exceeds 90 seconds. Use of such slow-rise formulations avoids prior art problems of excessive throughputs and conveyor speeds, effects advantages in fabrication and results in increased product yield.

Another embodiment of the present invention is directed to the use of a slow-rise formulation with an apparatus utilizing a specific pouring board arrangement onto which slow-rise liquid polyurethane formulations are deposited. The arrangement consists of pouring boards having multiple segments, each at a different angle. In a preferred embodiment, the pouring board comprises two segments with a first segment, located where the formulation is deposited, having an angle about 8° to 10° from horizontal and a second segment having an angle about 25° to 30° from horizontal. The second segment is adjacent a conveying means. In another embodiment of the present invention, a pouring board having three sections is utilized. Each of the aforementioned pouring board arrangements in combination with the slow-rise polyester-derived polyurethane formulation effects a polyurethane foam product that is substantially rectangular in cross-section.

BRIEF DESCRIPTION OF THE DRAWINGS

Several preferred embodiments of the invention are described below with references to the accompanying drawings, in which:

FIG. 1 is an elevation and partial section of an embodiment of the present invention for producing slabs of polymeric foam of substantially rectangular cross-section; and FIG. 2 is also an elevation and partial section of a modification of FIG. 1 wherein a segmented pouring board is depicted for producing polymeric foam slab of rectangular cross section.

DETAILED DESCRIPTION OF THE PREFERRED EMBODIMENTS

Referring now to FIG. 1, an apparatus for producing slabs of free-rising polyester-derived polyurethane foam having a substantially rectangular cross section is illustrated. Such apparatus is suitable for use with the process of the present invention. The apparatus includes a depositing means 11 for depositing the polyurethane foam generating reaction mixture and forming a continuous slab mold 12. Depositing means 11 usually includes a conventional mixing head 15. In general, the mixing head 15 has first and second mixing head inlets 13 and 14 for introducing polymeric foam reactants into mixing head 15 which has an outlet connected to depositing means 11.

Depositing means 11 directs the polyurethane foam generating reaction mixture from the interior of the mixing head to the slab mold 12. Nozzle 16 is positioned above a pouring surface 22 of pouring board 17. Nozzle 16 can be reciprocated across the width of the mold 12 by conventional reciprocation means. A first edge 18 of pouring board 17 is adjacent a surface of a conventional belt conveyor 19, which is used to form a mold-bottom surface 20. That surface is preferably substantially horizontal.

A mold-bottom liner 21 made of a flexible-web such as Kraft paper is supplied from a roll shown in the drawing and is guided over pouring surface 22 down past first edge 18 onto mold-bottom surface 20 of the belt conveyor 19. The mold-bottom liner 21 is continuously translated with translating belt conveyor 19.

First and second mold-side walls are positioned adjacent to mold-bottom surface 20 and are preferable perpendicular to surface 20. First mold-side wall 23 is illustrated. A mold-side liner 24, also made of a flexible-web such as Kraft paper or polyethylene film, is positioned flat against the first mold-side wall 23 and is drawn from a roll shown in the drawing. The second mold-side wall and a complementary mold-side liner are now shown but are positioned on the opposite side of belt conveyor 19 in a manner identical to its described counterpart. First and second mold-side liners and the mold-bottom liner define a channel-shaped mold for casting foam slabs, which preferably have a substantially rectangular cross-section. Means are provided for guiding and translating the side liners and bottom-liner in a parallel relationship. Of course, the rates of translation of the three liners are equal and identical to the rate of translation of belt conveyor 19.

Pouring surface 22 is substantially planar and makes an angle $\alpha$, which in accord with the slow-rise polyester-derived polyurethane foam formulations of this invention should be no greater than 15° from horizontal. The angle of inclination $\alpha$ of the pouring surface 22 can be changed to accommodate variations in the viscosity of the reaction mixture.

Although a planar pouring board 17 is illustrated in FIG. 1, in certain applications it can be advantageous to employ pouring boards having segments such as that shown in FIG. 2, each segment being inclined at a different angle from horizontal. FIG. 2 shows a pouring board consisting of two segments, a first segment 25 located adjacent pouring nozzle 16 and having an angle $\beta$ from horizontal and a second segment 26 abutting first segment 25 and adjacent to belt conveyor 19 having an angle $\gamma$ from horizontal. When using the slow-rise polyurethane foam formulation of the present invention to obtain a rectangular block 40 inches in height, the first segment 25 should be about 7 feet in length and have an angle $\beta$ of from about 9 degrees to 12 from horizontal. Second segment 26 should be about 3 feet in length and have an angle from about 25 degrees to about 30 degrees from horizontal. Such a pouring board arrangement can be used to make slabs of rectangular cross-section of about 40 inches in height.

Further segmented pouring boards are within the purview of the subject invention. Alternatively, a curved pouring board could be used if desired.

In accordance with the process of the subject invention, a first component A enters the mixing head 15 via mixing head inlet 13 and a second component B simultaneously enters mixing head 15 via mixing head inlet 14. These components are mixed and the mixture travels through deposit means 11 to nozzle 16 to be deposited on inclined pouring surface 22. The mixture is normally deposited at a constant rate and at ambient conditions. The components of the mixture react to form a polyurethane foam slab. As the mixture is deposited on surface 22, it continuously translates along with the mold liners and the conveyor. The conveyor normally translates at a constant speed.

Slow-rise formulations of polyester-derived polyurethane are necessary to the process of the subject invention. Typical formulations are exemplified hereinafter. The criticallity of these formulations resides in the amount of amine catalyst and surfactant added to the foam formulation. Slow-rise formulations of the subject invention require relatively small quantities of amine catalyst and surfactant so that the rise time of the particular foam formulation exceeds ninety (90) seconds.

The use of relatively smaller amounts of amine catalyst and surfactant to attain foam products of increased height is demonstrated by the comparison provided in Examples I through X hereinafter.

EXAMPLES

The following examples are illustrative of the ease with which polyester-derived polyurethane foam may be produced in accordance with the process of this invention:

EXAMPLE I

A slab of polyester-derived polyurethane foam was cast continuously using a conventional reciprocating mixing head, illustrated in FIG. 1. The following formulation was mixed in the head:

|  | Parts by Weight |
| --- | --- |
| Ingredient-Component A |  |
| Polyester E-280 (Mobay Chemical Company) | 100.00 |
| Surfactant DC-1312 (Dow Chemical Company) | 1.00 |
| Y-6721 (Union Carbide) | 0.50 |
| Water | 4.15 |
| Amine Catalyst ESN (Union Carbide) | 2.70 |
| Ingredient-Component B |  |
| TD-80 (Mobay Chemical Company) | 47.49 |

The ingredients of Component A, comprising the polyester component, were premixed and pumped as a single stream into the mixing head. Component B, comprising the toluene diisocyanate component, was separately and simultaneously pumped into the head. Then the two components were mixed at ambient temperature. The combined feed rate of the blended components was about 16.1 pounds/minutes. The resulting mixture was deposited at a constant rate on a pouring board inclined at an angle of 5.7 degrees from horizontal, a normal angle for free-rising polyester-derived polyurethane foam formulations. Consonant with FIG. 1, the mold was channel-shaped with parallel sidewalls, spaced apart about 18 inches. The mold was lined with Kraft paper, all of which translated at a constant speed of about 5.1 foot/minute.

The molded foam slab was of good quality and was about 14 feet in length. The slab was 18 inches wide and had a 15 inch center height and 12.5 inch shoulder height. The average height of the slab was 13.3 inches.

EXAMPLE II

The purpose of this example was to obtain a slab height which exceeds the previous example by reducing the amount of amine catalyst and to obtain increased stability by modifying the surfactant system. The amount of the amine catalyst ESN in Example I was decreased to 1.35 parts by weight and the surfactant DC-1312 was reduced to 0.5 parts by weight. Otherwise, Example II was identical to Example I.

The polyurethane foam produced was of good quality. A slab of approximately 10 feet was made and was 18 inches wide. The slab had a 16.5 inch center height and a 14 inch shoulder height. These dimensions showed an improvement in block height over the previous example.

EXAMPLE III

This example was the same as Example II except that the angle of the pouring board was changed to about 8.6 degrees from horizontal. The product had a center height of 16.75 inches and a shoulder height of 14.5 inches. Accordingly, the shoulder height was 87% of the center height.

EXAMPLE IV

This example duplicates Example II, except the angle of the pouring board was about 11.5 degrees from horizontal. Here, the foam product had a center height of 19 inches and a shoulder height of 17 inches. Consequently, the shoulder height was 89% of the center height.

EXAMPLE V

This example is a duplication of Example II except the reaction mixture was poured on a board inclined at an angle of about 15 degrees from horizontal. Here the blended ingredients began to "run down" the pouring board indicating that a 15 degree angle was too great, and consequently, an undesirable product was obtained.

EXAMPLE VI

The purpose of this experiment was to determine the commercial feasibility of producing foam products with a substantially round cross-section of a diameter of about forty (40) inches at reduced amine catalyst levels. The formulation employed was:

|  | Parts by Weight |
|---|---|
| Ingredient-Component A |  |
| Polyester F-203 (Hooker Chemical Company) | 100.00 |
| Silicone Surfactant L-532 (Union Carbide) | 1.50 |
| Black Paste-287 (Custom Chemical Company) | 1.86 |
| Catalyst B-16 (Lonza) | 0.09 |
| Water | 3.90 |
| Catalyst ESN (Union Carbide) | 1.60 |
| Ingredient-Component B |  |
| TD 80 (Mobay Chemical Company) | 46.96 |

The cream time for the formulation was more than nine (9) seconds and the rise time was more than ninety (90) seconds. The round foam product was produced according to the method described and claimed in U.S. Pat. No. 3,325,573 employing a throughput of 180 pounds/minute.

The slower formulation showed no evidence of instability and the foam product obtained was essentially round in cross section.

EXAMPLE VII

This experiment states conditions to produce a round polyurethane foam product whose height will exceed fifty (50) inches. This example follows the process of Example VI, except that the angle of the pour board should be about 6 degrees from horizontal and its length should be about 20 feet. The conveyor speed and feed rate should be adjusted for this experiment to about 18 feet/minute and 468 pounds/minute, respectively. A satisfactory product with an essentially round cross section whose height exceeds fifty (50) inches should be obtained.

EXAMPLE VIII

This example states conditions to produce rectangular foam products whose height would be greater than forty (40) inches. The formulation to be utilized in this experiment is the formulation of Example VI. The product should be produced in a manner similar to that of Examples II to IV except that the total feed rate of about 342 pounds/minute and the conveyor speed should be about 22 feet/minute. Furthermore, the pouring board should have an angle of about 6.5 degrees from horizontal. The product in theory will have a density of 1.82 pounds/cubic foot and its height will exceed forty (40) inches.

EXAMPLE IX

The purpose of this experiment was to determine whether a two-segment pouring board, each segment having a different angle, could flatten the top of the rectangular foam product. This experiment reproduced Example II except that the first segment of the board had an angle of about 10 degrees from horizontal and the second segment had an angle of 30 degrees from horizontal. The foam product had a center height of 18.5 inches and a shoulder height of 17.75 inches. Thus, the shoulder height was 97% of the center height. These results indicate that in order to produce products having heights exceeding forty (40) inches, a throughput of less than 300 pounds/minute and a pouring board whose length of about 10 feet should be required.

EXAMPLE X

Example IX was reproduced here except that the pouring board was further segmented. The pouring board consisted of three segments. The first segment next to the pouring point of the board, had an angle of about 12 degrees followed by a second segment having an angle about 1.5 degrees and having a third and last segment having an angle about 36 degrees. A foam product was obtained having a center height of 15 inches and a shoulder height of 14.5 inches. The three section pouring board arrangement showed a significant flattening effect, that is, a shoulder height which is 97% of the center height.

It is not intended to limit the present invention to the specific embodiments described above. Other changes may be made in the process and apparatus specifically described herein without departing from the scope and teachings of the instant invention, and it is intended to encompass all other embodiments, alternatives and modifications consistent with the present invention.

I claim:

1. In a process for continuously molding flexible polyester-derived polyurethane foam in a laterally translated open top mold in which a polyurethane foam generating reaction mixture employing an amine as catalyst and water as blowing agent is deposited on said mold, the improvement comprising increasing the height of the molded polyurethane foam product obtained at a given conveyor speed and throughput by increasing the rise time of the reaction mixture generating said foam to greater than ninety seconds by using a lower concentration of amine catalyst in the starting polyurethane foam generating reaction mixture.

2. The process according to claim 1 wherein the height of the molded foam product obtained is equal to or greater than forty (40) inches.

3. The process of claim 2 wherein the molded foam product obtained has a substantially round cross section.

4. The process of claim 2 wherein the molded foam product obtained has a substantially rectangular cross section.

5. The process of claim 2 wherein the polyurethane foam generating reaction mixture is deposited on a pouring board inclined at an angle of less than about 15 degrees from horizontal.

6. The process of claim 2 wherein the polyurethane foam generating reaction mixture is deposited on a first segment of a pouring board having an angle of about 8 to 10 degrees from horizontal and thereafter travels down a second segment having an angle of about 25 to about 30 degrees from horizontal.

7. The process of claim 2 wherein the polyurethane foam generating reaction mixture is deposited on a first segment of a pouring board having an angle of about 9 to 12 degrees from horizontal, and thereafter travels down second and third segments thereof having an angle of about 1 to 2 degrees and about 30 to 36 degrees from horizontal respectively.

* * * * *